United States Patent [19]
Weidinger

[11] Patent Number: 5,540,313
[45] Date of Patent: Jul. 30, 1996

[54] VEHICULAR MANUAL TRANSMISSION HAVING A FRICTION CLUTCH WITH AUTOMATIC WEAR COMPENSATION

[75] Inventor: Reinhold Weidinger, Unterspiesheim, Germany

[73] Assignee: Fichtel & Sachs AG, Schweinfurt, Germany

[21] Appl. No.: 234,985

[22] Filed: Apr. 28, 1994

[30] Foreign Application Priority Data

Apr. 29, 1993 [DE] Germany ............................ 43 14 024

[51] Int. Cl.⁶ ...................................................... F16D 13/75
[52] U.S. Cl. ..................................... 192/70.25; 192/111 A
[58] Field of Search ............................. 192/70.25, 111 A, 192/89.23, 89.24

[56] References Cited

U.S. PATENT DOCUMENTS

| | | |
|---|---|---|
| 4,099,604 | 7/1978 | Higgerson . |
| 4,207,972 | 6/1980 | Zeidler . |
| 4,228,883 | 10/1980 | Palmer ............................... 192/111 A |
| 5,069,322 | 12/1991 | Mizukami et al. . |
| 5,090,536 | 2/1992 | Asada . |
| 5,186,298 | 2/1993 | Takeuchi . |
| 5,377,803 | 1/1995 | Link et al. ............................ 192/111 A |
| 5,404,979 | 4/1995 | Craft et al. ........................... 192/70.25 |
| 5,409,091 | 4/1995 | Reik et al. ............................ 192/70.25 |

FOREIGN PATENT DOCUMENTS

| | | |
|---|---|---|
| 2599446 | 12/1987 | France . |
| 2606477 | 5/1988 | France . |
| 2303618 | 9/1973 | Germany . |
| 2920932 | 11/1979 | Germany . |
| 2916755 | 11/1979 | Germany . |
| 3323995 | 1/1985 | Germany . |
| 3420537 | 12/1985 | Germany . |
| 3518781 | 11/1986 | Germany . |
| 2261923 | 6/1993 | United Kingdom ............... 192/111 A |

*Primary Examiner*—Richard M. Lorence
*Attorney, Agent, or Firm*—Nils H. Ljungman & Associates

[57] ABSTRACT

The present invention generally relates to a friction clutch with automatic compensation for wear inside the pressure plate. For this purpose, between the membrane spring and the pressure plate, there are preferably two sheet metal rings located one axially behind the other, which rings have sections facing one another which sections form a gradient, whereby a torque is applied in opposite directions to the two rings by means of a spring device.

20 Claims, 4 Drawing Sheets

VEHICULAR MANUAL TRANSMISSION HAVING A FRICTION CLUTCH WITH AUTOMATIC WEAR COMPENSATION

BACKGROUND OF THE INVENTION

1. Field of the Invention

The present invention generally relates to a friction clutch with automatic compensation for wear inside the pressure plate, which pressure plate can preferably be fastened to the flywheel of an internal combustion engine, the friction clutch comprising the pressure plate located in a torsionally stationary and axially movable manner in the clutch housing, a membrane spring located between the clutch housing and pressure plate, which membrane spring is braced against the clutch housing and the pressure plate, and which membrane spring applies pressure to the pressure plate thereby moving the pressure plate towards the flywheel, a clutch disc with friction linings between the pressure plate and the flywheel, and an adjustment device to increase the distance between the membrane spring and the pressure plate as a function of the wear on the friction lining, the adjustment device being in the form of a ring element which ring element is guided on a guide diameter of the pressure plate concentric to the axis of rotation of the friction clutch.

2. Background Information

Such a friction clutch is disclosed, for example, by German Patent Specification 29 20 932, which corresponds to U.S. Pat. No. 4,207,972 granted to Zeidler on Jun. 17, 1980. On this type of friction clutch, the components of the mechanism which automatically compensates for wear consists of a ring element which is guided on a guide diameter of the pressure plate concentric to the axis of rotation, and which ring element is in contact by means of oblique or slanted circumferential surfaces with corresponding opposite oblique surfaces of the pressure plate. By means of a tension spring, force is applied to the circumference of the ring element opposite the pressure plate, so that the ring element, as a result of the torsion relative to the pressure plate, can increase the distance from the pressure plate. A membrane spring is in contact on the side of the ring element opposite the pressure plate. When wear occurs on the friction lining of the clutch disc, and when the membrane spring lifts up from the ring element, the latter is twisted by the tension spring into the gap which is formed, and thus there is a compensation for wear. The membrane spring therefore remains constant over the entire wear distance in its position relative to the clutch housing, so that the forces exerted by the membrane spring also remain constant. The model of the prior art is quite complex and expensive, since a precise machining of the pressure plate is necessary, and a complicated ring element must by used.

OBJECT OF THE INVENTION

The object of the present invention is, therefore, to create a friction clutch with automatic compensation for wear, one which can be manufactured simply and economically, and which can be assembled and installed easily.

SUMMARY OF THE INVENTION

The invention teaches that this object can be achieved by providing a friction clutch with automatic compensation for wear inside the pressure plate, which pressure plate is fastened to the flywheel of an internal combustion engine, the friction clutch preferably comprising the pressure plate located in a torsionally stationary and axially movable manner in the clutch housing, a membrane spring located between the clutch housing and pressure plate, which membrane spring is braced against the clutch housing and the pressure plate, and which membrane spring applies pressure to the pressure plate to move the pressure plate toward the flywheel, a clutch disc with friction linings between the pressure plate and the flywheel, and an adjustment device to increase the distance between the membrane spring and the pressure plate as a function of the wear on the friction lining in the form of a ring element, which ring element is guided on a guide diameter of the pressure plate concentric to the axis of rotation of the friction clutch, characterized by the fact that the ring element consists of two rings located axially one behind the other, one of which is braced axially on the pressure plate, the other of which is braced on the membrane spring, and both of which rings are supported circumferentially in the areas facing one another by means of surface sections in the areas facing one another, and whereby there is a spring device, which spring device presses the two rings toward one another, and when wear occurs, rotates them in opposite directions to one another, to increase the axial space occupied by the two rings.

As a result of the division of the ring element into two rings, which rings are preferably oriented axially one behind the other, and as a result of the surface sections which preferably produce the gradient in the facing areas of the two rings, it is possible to give both rings, in the axially outward areas (i.e. on one hand facing the pressure plate and on the other hand facing the membrane spring), a simple circular edge. The pressure plate can also be provided with a corresponding edge, which can significantly simplify the manufacturing process. Further, as a result of the positioning of the spring device between the two rings, it is possible that the two rings can easily be installed as a unit on the pressure plate, without having to take into consideration the precise circumferential orientation between the rings and the pressure plate.

According to an additional advantageous feature of the present invention, the surface sections of the two rings each can run continuously as a function of the specified gradient. Such a configuration can be manufactured particularly economically.

However, it is also possible to make the surface sections of the two rings with individual sections, each running in step-fashion, parallel to a plane perpendicular to the axis of rotation, each of the individual sections having an axial shoulder.

Such a configuration can have the advantage that neither the spring device nor the pressure force of the membrane spring generates a circumferentially-directed component of force which would be applied to both rings in either direction of rotation. With such a configuration and with such a surface in individual sections, each with a shoulder, the adjustment for a worn lining is accomplished by the vibrations of the internal combustion engine, as the force of the membrane spring is relaxed during the disengagement process. Thus, the surface sections can be released or jarred beyond the respective shoulder, and a relative twisting of the two rings becomes possible, thereby increasing the axial space occupied by the two rings. The individual shoulders are, therefore, kept on an order of magnitude of approximately 0.2 mm. However, the individual shoulders are not to be taken as limited to this dimension.

An additional advantageous feature of the present invention is that the spring device can preferably have at least one tension spring, which tension spring can extend essentially tangentially and on the inside of the two rings. Further, the tension spring is suspended with one end in an opening of the one ring and with the other end in an opening of the other ring. Such a configuration can be easily pre-assembled, and then inserted into the pressure plate.

According to one preferred embodiment, the two rings can be manufactured, particularly economically and simply, of strips of sheet metal. Such strips of sheet metal typically produce very little scrap during the manufacturing process (preferably stamping), and can then easily be bent into a ring.

The sheet metal rings bent in this manner can thereby be given a closed circumference (e.g. by welding), but they can also have an open circumference and have a gap. Such a configuration is typically particularly simple to manufacture.

One aspect of the present invention resides broadly in a friction clutch for a motor vehicle with automatic compensation for wear, the friction clutch comprising: a clutch housing; a clutch disc for being disposed on a transmission input shaft having a longitudinal axis, the clutch disc being axially movable along the transmission input shaft; a pressure plate for engaging and disengaging the clutch disc with the flywheel, the pressure plate being axially movable along the transmission input shaft; the clutch disc comprising: friction lining means disposed between the pressure plate and the flywheel for contacting the flywheel and the pressure plate upon engagement of the clutch disc; lever means disposed between the clutch housing and the pressure plate for applying pressure to the pressure plate and for biasing the pressure plate towards the flywheel; ring means disposed on and in contact with the pressure plate substantially concentrically with respect to the longitudinal axis; the ring means comprising: two ring portions disposed axially adjacent one another; the two ring portions together having a first width defined in a direction substantially parallel to the longitudinal axis; and biasing means for biasing the two ring portions to rotate with respect to one another to increase the first width of the two ring portions upon wear of the friction lining means.

Another aspect of the present invention resides broadly in a transmission system for a motor vehicle having a friction clutch with automatic compensation for wear, said transmission system comprising: a flywheel fastened to rotate with the crankshaft of an internal combustion engine; a clutch housing; a transmission input shaft having a longitudinal axis; a clutch disc disposed on said transmission input shaft, the clutch disc being axially movable along the transmission input shaft; a pressure plate for engaging and disengaging the clutch disc with the flywheel, the pressure plate being axially movable along the transmission input shaft; the clutch disc comprising: friction lining means disposed between the pressure plate and the flywheel for contacting the flywheel and the pressure plate upon engagement of the clutch disc; lever means disposed between the clutch housing and the pressure plate for applying pressure to the pressure plate and for biasing the pressure plate towards the flywheel; ring means disposed on and in contact with the pressure plate substantially concentrically with respect to the longitudinal axis; the ring means comprising: two ring portions disposed axially adjacent one another; the two ring portions together having a first width defined in a direction substantially parallel to the longitudinal axis; and biasing means for biasing the two ring portions to rotate with respect to one another to increase the first width of the two ring portions upon wear of the friction lining means.

BRIEF DESCRIPTION OF THE DRAWINGS

The preferred embodiments of the present invention are explained in greater detail below with reference to the accompanying figures, in which.

DESCRIPTION OF THE PREFERRED EMBODIMENTS

Figure 1:
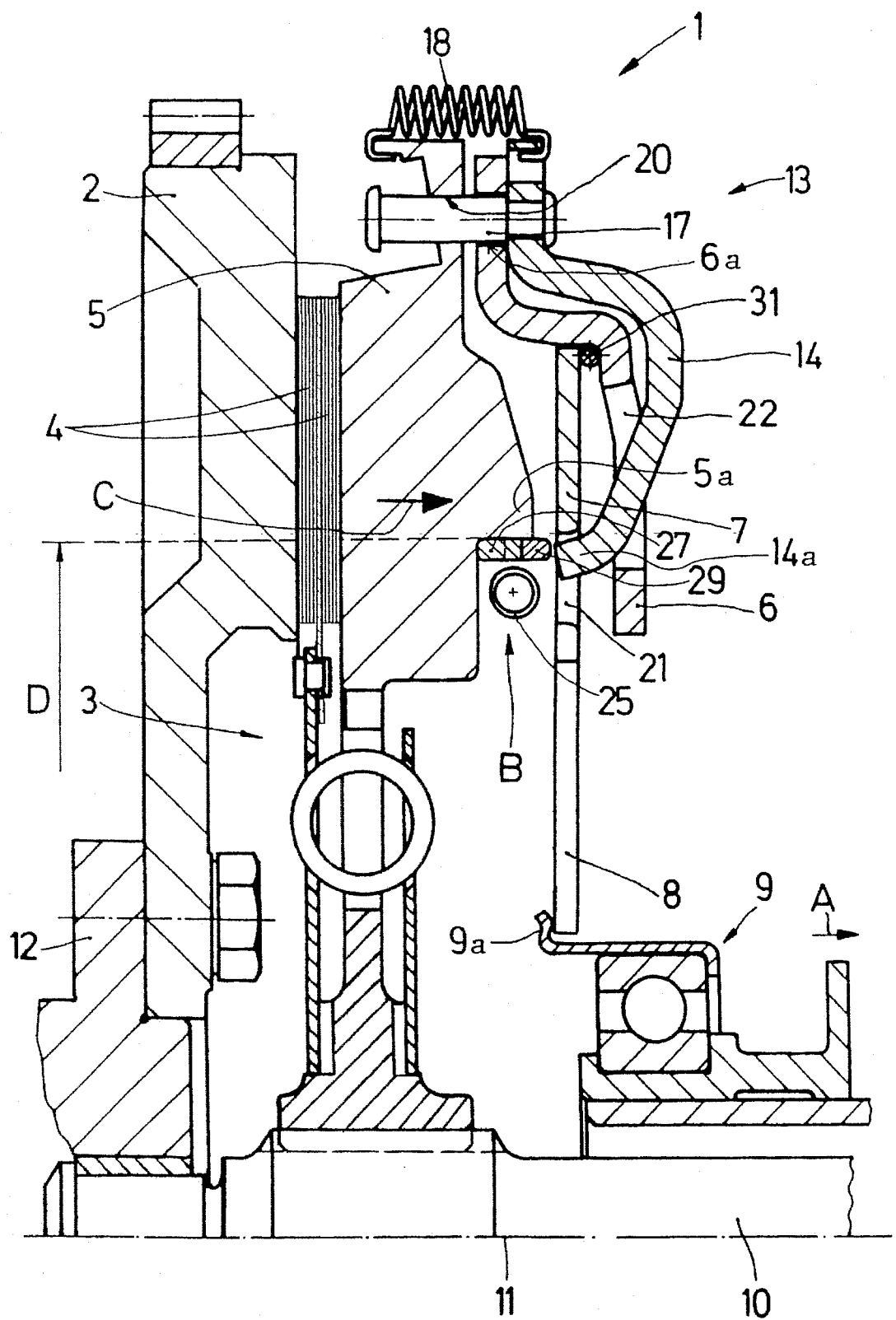
FIG. 1 shows the upper half of an axial section through a complete friction clutch.

FIG. 1 shows a friction clutch 1 with a flywheel 2, which flywheel 2 is fastened to the crankshaft 12 of an internal combustion engine. The flywheel 2 rotates together with the crankshaft 12, around the axis of rotation 11. In conjunction with the flywheel 2 there is a clutch housing 6, which encloses the clutch disc 3, the pressure plate 5 and the membrane spring 7. The pressure plate 5 is mounted in a manner not illustrated in any further detail but generally in a manner known in the art, on the clutch housing 6 so that it is torsionally stationary, but can move axially. The orientation of the membrane spring 7 is the orientation found in a "pulled" friction clutch or friction clutch under tension, whereby the outside diameter of the membrane spring 7 is in contact with the clutch housing 6, preferably by means of a wire ring 31. Further, a central area of the membrane spring 7 exerts an axially-directed force on the pressure plate 5, to clamp the friction lining 4 of the clutch disc 3 between the pressure plate 5 and the flywheel 2, thereby engaging the clutch 1. Thus, the clutch disc 3 is mounted so that the clutch disc 3 is essentially torsionally stationary, but axially movable on the transmission shaft 10.

Figure 3A:
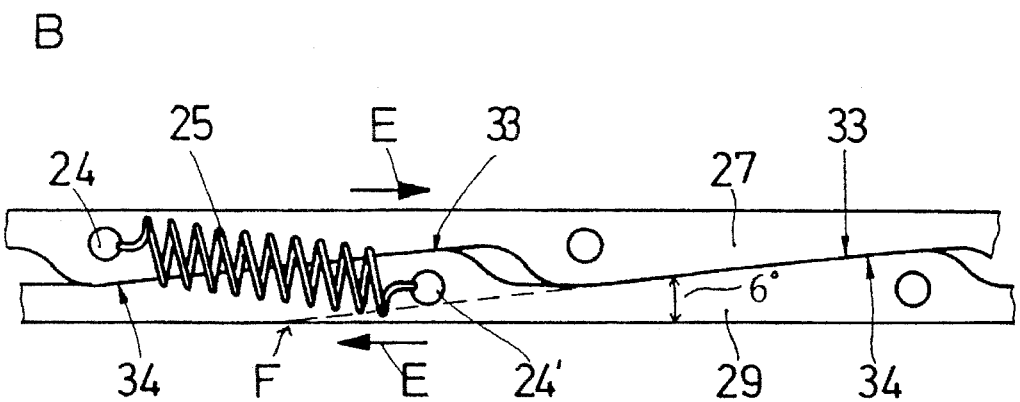
FIG. 3a is View "B" of one preferred ring configuration from radially inside.

In the engaged position of the friction clutch 1, a biasing force is transmitted from the membrane spring 7 to the pressure plate 5 by means of a ring element, which ring element is preferably radially guided on a guide diameter D of the pressure plate 5. The ring element is comprised of two coaxial rings 27 and 29. FIG. 3a, which shows View "B" as indicated in FIG. 1, shows a radially inside view of the two rings 27 and 29. If an adjustment is needed due to the wearing of the friction linings 4, the two rings 27 and 29 are pulled toward one another, at least by a tension spring 25, in the circumferential direction with a force which twists the two rings 27 and 29 in opposite directions as indicated by the Arrows E, thus increasing the axial space occupied by the two rings 27 and 29.

Referring back to FIG. 1, a releasing device 9 is shown, which releasing device 9 reaches behind the flexible tabs 8 of the membrane spring 7, and which releasing device 9 is preferably moved in the direction of the Arrow A to disengage the friction clutch. When the friction clutch 1 is released or disengaged, corresponding to the movement A of the releasing device 9 to the right, the membrane spring 7 is tipped or pivoted with respect to the wire ring 31, and the clamping force on the friction linings 4 is released, and the clutch 1 is disengaged. As a result of a releasing force, which force is believed to be aerodynamic and which force preferably acts on the pressure plate 5 in the direction indicated by Arrow C, the pressure plate 5 is held by means of the two rings 27 and 29 in contact with the central area of the membrane spring 7, and the ring 29 is simultaneously in contact with the sensing lever 14 of a clearance sensor 13. This releasing force, which preferably acts on the pressure plate in the direction indicated by Arrow C, could possibly come about a a result of the absence of the force of the membrane spring 7. The other ring 27, viewed in the axial direction, is preferably in contact with a surrounding or circular portion of the pressure plate 5. Both rings 27 and 29 are fixed in the radial direction by the guide diameter D of the pressure plate 5.

During the disengagement process, there can be several clearance sensors 13 distributed about the circumference of the clutch housing 6, or possibly distributed over the circumference of the pressure plate 5. During the disengagement process, the clearance sensors 13 move to the right along with the pressure plate 5. Each sensing lever 14 has a sliding bolt 17, the axis of which sliding bolt 17 extends in a parallel direction with respect to the axis of rotation 11. The sliding bolt 17 preferably extends through the pressure plate 5 in a hole 20. In this hole 20, the bolt 17 is fixed during this process by jamming, or possibly by tilting, preferably to frictionally maintain the bolt 17 in a substantially fixed position during normal operation. The jamming of the sliding bolt 17 is assisted by means of respective tension springs 18. The sliding bolt 17 thereby extends with sufficient play through a corresponding opening 6a in the clutch housing 6. The tension springs 18 can be disposed to "twist" the clutch housing 6 relative to the pressure plate 5, to essentially misalign holes 20 and 6a. The sensing lever 14 also preferably runs radially inside the sliding bolt 17, and through the clutch housing 6 in an opening 22. Thus, the bolt 17 can conceivably have a slot or opening through which the sensing lever 14 can extend. The sensing lever 14 also extends through the membrane spring 7 by means of an opening 21. The end 14a of the sensing lever 14 is in direct contact with the ring 29.

Figure 4:
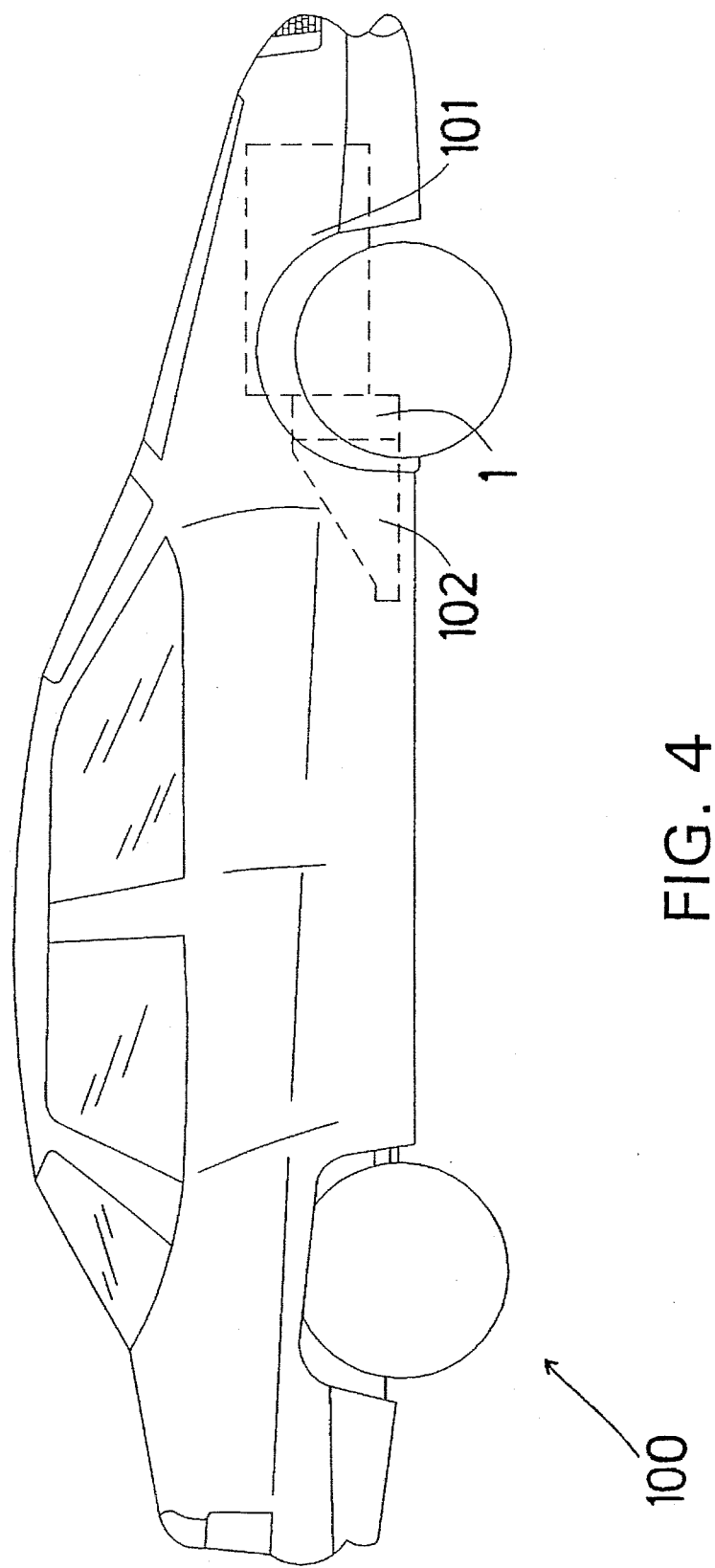
FIG. 4 shows a typical automobile incorporating the present invention.

The clearance sensors 13 discussed above may, in an alternative embodiment of the present invention, be in the form of self-adjusting collars or stop means labelled 52 and as shown in FIG. 4 and as discussed in column 3 of U.S. Pat. No. 4,207,972 (cited above).

In one preferred embodiment, before any wear of the friction lining 4 has occurred, disengagement of the clutch 1 is begun by moving the releasing device 9 in the direction shown by Arrow A in FIG. 1 (i.e. to the right). A flange or projection 9a preferably causes the membrane spring 7 to pivot about the wire spring 31, thus the pressure previously exerted on the pressure plate 5 by means of the membrane spring 7, is released, allowing the pressure plate 5 to also move to the right in accordance with Arrow C. As discussed previously, a releasing force can preferably cause the pressure plate 5 to move to the right, the releasing force possibly being the result of the absence of the force of the membrane spring 7 on the pressure plate 5. Thus, as the membrane spring 7 moves to the right, the pressure on the pressure plate 5 is lessened and, the membrane spring 7 may even lose contact with the ring 29 at some point during the disengagement process.

The sensing lever 14 can be positioned during assembly, so that the spring 18, and the sliding bolt 17 preferably hold the sensing lever 14 in a predetermined position with respect to the pressure plate 5 and the two rings 27 and 29. Further, also during assembly, the membrane spring 7 can be aligned so that the membrane spring 7 is in a position approximately perpendicular to the axis of rotation 11. Both of these positions of the membrane spring 7 and the sensing lever 14 would preferably correspond to the "engaged" position of the clutch 1. The sensing lever 14 can then be positioned so that the end 14a of the sensing lever 14 would preferably be in contact with ring 29, and, as discussed above, the sliding bolt 17 and the spring 18 can then be used to hold this position of the sensing lever 14.

Thus, due to the original positioning of the membrane spring 7 and the sensing lever 14 during assembly, during the disengagement process there is at least some contact between ring 29 and the membrane spring 7, and also between the ring 29 and the sensing lever 14.

During the subsequent engagement process, wear can occur to the friction lining 4 as a result of the high stresses involved, so that the membrane spring 7 brings the pressure plate 5 into a position closer to the flywheel 2, most likely due to the thinner condition of the friction lining 4. Since the pressure plate 5 is in a position closer to the flywheel 2, the sensing lever 14 can essentially not execute the corresponding differential movement as it typically does when there is no wear of the friction lining 4, since the sensing lever 14 preferably comes in contact with the outside of the clutch housing 6 in the vicinity of the sliding bolt 17, as shown in FIG. 1. During the engagement process, therefore, a gap can be formed between the ring 29 and the radially inner area or end 14a of the sensing lever 14. The two rings 27 and 29, however, due to the application of an axial force by the membrane spring 7 under these conditions, or during engagement of the clutch, are essentially unable to achieve any compensation for wear. Essentially only during the subsequent disengagement process, (i.e. when the clamping force of the membrane spring 7 is removed or at least lessened), and essentially only the relatively low releasing force is active as indicated by Arrow C between the pressure plate 5 and the membrane spring 7, can the gap between the ring 29 and the sensing lever 14 be adjusted. Thus, the spring device, which spring device can have at least one tension spring 25, preferably twists the two rings 27 and 29 as shown in the direction of Arrows E (see FIG. 3a), so that the partial surfaces 33 and 34, which are preferably oblique in relation to a plane perpendicular to the axis of rotation 11, ascend on one another, thereby increasing the overall width of the ring element. Thus, the sensing lever 14 may serve to limit the ability of the rings 27 and 29 to expand.

FIG. 3a shows that the tension spring 25 is preferably suspended with one end of the tension spring 25 in an opening 24 of the one ring 27, and with its other end in an opening 24' of the other ring 29. The two rings 27, 29 can thus be twisted until the gap between the ring 29 and the sensing lever 14 is closed or filled. Thus, the membrane spring 7 is again in its original position in relation to the clutch housing 6, and this position can preferably be maintained throughout the entire wear life of the friction lining 4. Thus the force of the membrane spring 7 is kept constant over the entire life of the unit.

Thus, in summary, the friction linings 4 typically wear and thus become thinner with use. In one preferred embodiment, when the clutch 1 is being engaged, the membrane spring 7 moves the pressure plate 5 towards the flywheel 2, and since the friction linings 4 are thinner due to wear, the membrane spring 7 will most likely need to travel a greater arc of travel than was originally the case (i.e. when there was no wear of the friction linings 4) in order to force the pressure plate 5 against the flywheel 2. The sensing lever 14, which sensing lever 14 is normally in contact with the pressure plate 5 by means of ring 29 when there is no wear of the friction linings 4, due to the predetermined position of the sensing lever 14 as discussed above, now will most likely lose contact with the ring 29, and a gap may be formed between the sensing lever 14 and the ring 29 when the membrane spring 7 pushes the ring 29 towards the flywheel 2.

Therefore, the adjustment of the rings 27 and 29 will take place during the next disengagement of the clutch 1, or when the pressure of the membrane spring 7 is removed, or at least lessened, from the two rings 27 and 29. When the pressure of the membrane spring 7 is removed from the rings 27 and 29, the gap between the sensing lever 14 and the ring 29 is "sensed", and the spring 25 pulls the two rings 27 and 29 circumferentially along one another so that the axial space occupied by the two rings 27 and 29 is increased, thus preferably filling the gap. The membrane spring 7 can preferably resume the original position perpendicular to the axis of rotation 11, as discussed above.

Figure 2:
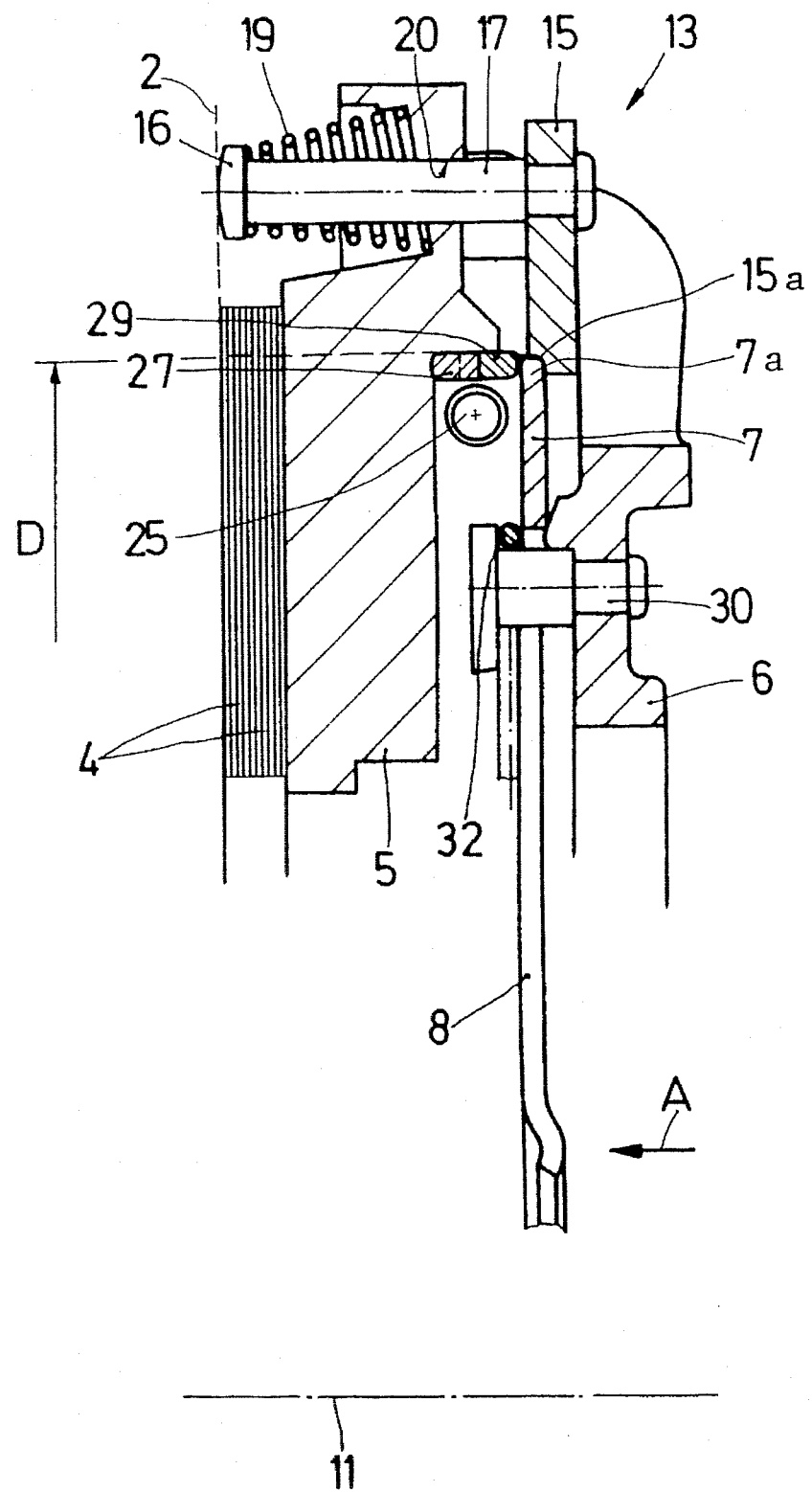
FIG. 2 shows the upper half of a structure similar to that shown in FIG. 1, in partial section.

FIG. 2 shows a configuration which differs somewhat from the configuration illustrated in FIG. 1. The differences relate to the fact that the friction clutch is a "pushed clutch" or a "clutch operating under compression", in which the membrane spring 7 acts by means of the outside diameter 7a, on the pressure plate 5. Further, the membrane spring 7 is fixed in its central diameter to the clutch housing 6, preferably by means of spacer bolts 30, and at least one wire ring 32, thereby forming a trigger or sweep circuit.

The clearance sensor 13 is also designed differently in the embodiment illustrated in FIG. 2. In this case, the activation levers 15 are preferably in contact on the side of the membrane spring 7 facing away from the pressure plate 5, and the corresponding sliding bolts 17 extend through the hole 20 in the pressure plate 5, so that the bolts 17 come in contact with a corresponding head 16 on the flywheel 2. A compression spring 19 is thereby preferably located between the head 16 and the pressure plate 5 such that the sliding bolt 17 is preferably jammed in the hole 20, and after wear has occurred on the friction lining 4, a relative axial movement can essentially only take place if the head 16 comes in contact with the flywheel 2 before the pressure plate 5 has assumed its engaged position.

The operation of the clutch shown in FIG. 2 is essentially as follows. To initiate a disengagement process, a force in the direction indicated by Arrow A is preferably exerted on the flexible tabs 8 of the membrane spring 7 by means of the release mechanism (not shown in FIG. 2). The membrane spring 7 thereby preferably pivots around the clamping point on the clutch housing 6, so that the outside diameter 7a of the membrane spring 7 is moved away (i.e. to the right) from the flywheel 2. The membrane spring 7 thereby can forcibly release the pressure plate 5, by means of the sensing lever 15 and the sliding bolts 17, which bolts 17 are preferably jammed in the hole 20. The two rings 27 and 29 are held by the spring device with the tension springs 25 essentially in continuous contact, on one hand with the pressure plate 5 and on the other hand with the membrane spring 7. During the subsequent engagement process, and with the corresponding wear of the friction lining 4, the pressure plate 5 is typically brought by the force of the membrane spring 7, with the interposition of the two rings 27 and 29, into the new position closer to the flywheel 2. The clearance sensors 13 with the activation levers 15 are essentially unable to follow this movement, since before that point, the heads 16 of the sliding bolts 17 come into contact with the flywheel 2, so that a gap can be formed between the outside diameter 7a of the membrane spring 7 and the radially inner areas 15a of the activation levers 15. The gap mentioned immediately hereinabove is typically formed as a result of the previous wear of the friction lining 4.

During the next disengagement process, the membrane spring 7 travels the wear distance toward the activation levers 15, possibly without disengagement from the pressure plate 5 in the wear area, or possibly near the radially inner areas 15a of the activation levers 15. The two rings 27 and 29 are thus able, by means of the tension springs 25, to execute a mutual relative movement as shown by Arrows E in FIG. 3a, so that the amount of wear which was produced during the preceding engagement process is preferably compensated by the axial expansion or spreading of the two rings 27 and 29. The result is the relative displacement of the pressure plate 5 in relation to the membrane spring 7.

With regard to the embodiments illustrated and described with respect to FIGS. 1 and 2, the adjustment, which is preferably accomplished by the movement of the two rings 27 and 29, may, in an alternative embodiment, occur due to a particular relationship between the strengths of membrane spring 7 and spring 25. Thus, during a disengagement of the clutch 1, the pressure of membrane spring 7 is lessened preferably by the motion of the releasing device 9 to the right, thus the spring 25 can preferably overpower the membrane spring 7 and cause the rings 27 and 29 to adjust and become axially wider, until the gap closed between the sensing lever 14 and the ring 29.

With regard to the embodiments illustrated and described with respect to FIGS. 1 and 2, the adjustment, which is preferably accomplished by the movement of the two rings 27 and 29, may, in an additional alternative embodiment, occur due to a particular relationship between the strengths of springs 25 and 18 (FIG. 1), or due to a relationship between between the strengths of springs 25 and 19 (FIG. 2). Thus, during a disengagement of the clutch 1, the pressure of spring 18 (FIG. 1) or spring 19 (FIG. 2), may be lessened so that spring 25 can overpower spring 18 (FIG. 1) or 19 (FIG. 2), and thus adjust the two rings 27 and 29 to fill the gap formed due to wear of the friction linings 4. In this embodiment, it is possible that the adjustment of the rings 27 and 29 could occur without a gap actually forming between sensing lever 14 (FIG. 1) or sensing lever 15 (FIG. 2) and ring 29.

Figure 3B:
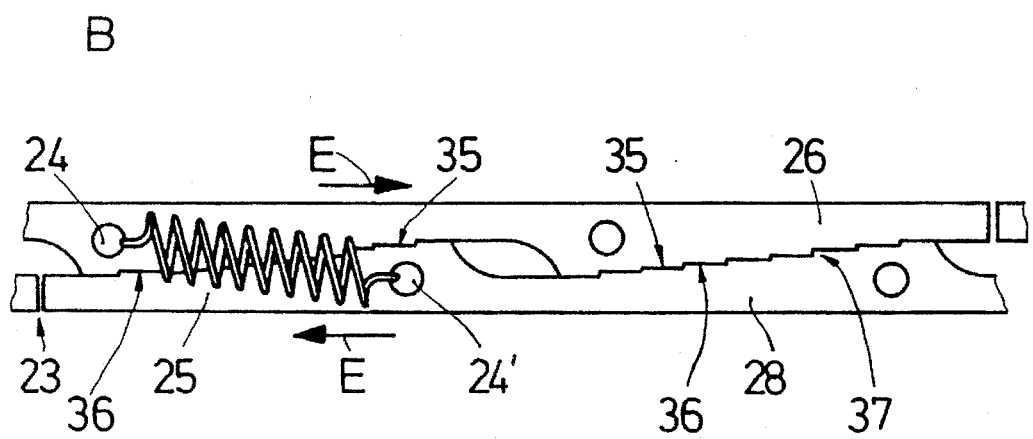
FIG. 3b is View "B" of an additional preferred ring configuration from radially inside.

FIGS. 3a and 3b show two different embodiments of the ring element. As shown in FIG. 3a, and as indicated above, the rings 27 and 29 can have partial surfaces 33 and 34 respectively in their areas facing one another, which surfaces 33 and 34 are oblique or angled on the circumference, preferably in relation to a plane perpendicular to the axis of rotation 11. When the force applied between the membrane spring 7 and the pressure plate 5 is removed, the two rings 27 and 29, as a result of the force of the tension springs 25, can be twisted in opposite directions with respect to one another, as indicated by the Arrows E, such that the partial surfaces 33 and 34 ascend over one another and the two rings thus occupy a greater axial space corresponding to the amount of wear experienced.

As shown in FIG. 3a, the surfaces 33 and 34 can each be angled by about 6° with respect to point F, but are not to be taken as limited to this angle.

FIG. 3b illustrates an additional embodiment of the ring element in which the rings 26 and 28 are equipped in the areas facing one another with surfaces 35 and 36 respectively, which surfaces 35 and 36 each run parallel to a plane perpendicular through the axis of rotation 11, and which surfaces 35 and 36 can preferably have individual matching steps to form an oblique surface, whereby from one individual section of the surfaces 35 and 36 to the next, there preferably is an axial shoulder 37. With this embodiment of the ring element, the oscillations produced by the crankshaft of the internal combustion engine are typically transmitted into the entire clutch 1, so that when there is wear of the friction lining 4 which is greater than the shoulders 37, these vibrations can typically make possible a relative motion of the two rings 26 and 28 toward one another in the direction indicated by Arrows E, when the friction clutch 1 is disengaged. The large axial force between the membrane spring 7 and the pressure plate 5 is also essentially eliminated.

In this case, the rings 26 and 28 are not closed around the circumference, as shown by gap 23 in FIG. 3b. The rings 26 and 28 are thus typically easy to manufacture. The preferably pre-bent rings 26 and 28 can thus be pressed easily against the guide diameter D of the pressure plate 5.

Further, as discussed with regard to FIG. 3a, the tension spring 25 is suspended with one end of the tension spring 25 in an opening 24 of the one ring 26, and with its other end in an opening 24' of the other ring 28.

In an alternative embodiment of the ring element (not shown), the two rings can be configured in a similar manner to the rings 26 and 28 shown in FIG. 3b. In this embodiment, however, the individual sections of the surfaces 35 and 36 are preferably angled upwards towards the next respective shoulder 37 of the next individual section. In this embodiment, the angling of the individual sections of the surfaces 35 and 36 may prevent slippage of the two rings 26 and 28 in a directions opposite from the Arrows E shown in FIG. 3b.

One particularly advantageous feature of the present invention is that the ring element can be manufactured as a separate component. Thus, no complicated machining of the surface of the pressure plate 5 which would be in contact with the ring element is necessary. In essence, essentially all that is needed in order to fit the ring element onto the pressure plate 5 is a lip or flange 5a (see FIG. 1), preferably having the diameter D. Thus, the manufacturing process of the ring element and the pressure plate 5 can be simplified, and also the costs of manufacture can preferably be reduced.

FIG. 4 shows what could be considered to be a typical automobile 100. Such an automobile could typically have an internal combustion engine 101 mounted in a forward portion thereof. The automobile could also typically include a drive shaft (not shown in FIG 4), and a manual transmission 102 for transmitting mechanical power to the wheels. Such an automobile could also typically include the friction clutch 1, for engaging the engine 101 with the transmission 102.

One feature of the invention resides broadly in the friction clutch with automatic compensation for wear inside the pressure plate fastened to the flywheel of an internal combustion engine, comprising a pressure plate located in a torsionally stationary and axially movable manner in the clutch housing, a membrane spring located between the clutch housing and pressure plate, which is braced against the clutch housing and the pressure plate and applies pressure to the pressure plate toward the flywheel, a clutch disc with friction linings between the pressure plate and the flywheel, and an adjustment device to increase the distance between the membrane spring and the pressure plate as a function of the wear on the friction lining in the form of a ring element which is guided on a guide diameter of the pressure plate concentric to the axis of rotation of the friction clutch, characterized by the fact that the ring element consists of two rings 26, 28; 27, 29 located axially one behind the other, one of which is braced axially on the pressure plate 5 and one on the membrane spring 7, and both of which are supported circumferentially in the areas facing one another by means of surface sections 33, 34; 35, 36 in the areas facing one another, and whereby there is a spring device 25, which presses the two rings toward one another, and when wear occurs, rotates them in opposite directions to one another, to increase the axial space occupied.

Another feature of the invention resides broadly in the friction clutch, characterized by the fact that the surface sections 33, 34 of the two rings 27, 29 each run continuously as a function of the specified gradient.

Yet another feature of the invention resides broadly in the friction clutch, characterized by the fact that the surface sections 35, 36 of the two rings 26, 28 consist of individual, graduated sections which run parallel to a plane perpendicular to the axis of rotation 11, each of which has an axial shoulder 37.

Still another feature of the invention resides broadly in the clutch disc, characterized by the fact that the spring device consists of at least one tension spring 25, which runs essentially tangentially and on the inside of the two rings 26, 28; 27, 29, and which is suspended with one end in an opening 24 of the one ring and with the other end in an opening 24 of the other ring.

Yet still another feature of the invention resides broadly in the friction clutch, characterized by the fact that the two rings 26, 28; 27, 29 are manufactured of sheet metal strips.

Another feature of the invention resides broadly in the friction clutch, characterized by the fact that the two rings 27, 29 are manufactured with a closed circumference.

Yet another feature of the invention resides broadly in the friction clutch, characterized by the fact that the two rings 26, 28 are manufactured with an open circumference gap 23.

Types of clutch assemblies which have wear sensors or adjustment mechanisms for detecting and adjusting for the wear of the friction linings of a clutch may be disclosed by the following Uunited States patents: U.S. Pat. No. 4,191,285 to Thelander et al. on Mar. 4, 1980, entitled "Wear Compensator for Belleville Spring Clutch"; U.S. Pat. No. 5,238,093 to Campbell on Aug. 24, 1993, entitled "Wear Indicator for Adjustable Clutch"; U.S. Pat. No. 4,953,680 to Flotow on Sep. 4, 1990, entitled "Clutch Adjuster"; U.S. Pat. No. 4,549,643 to Flotow et al. on Oct. 29, 1985, entitled "Self Adjusting Device for a Friction Clutch"; U.S. Pat. No. 4,310,086 to Mochida on Jan. 12, 1982, entitled "Automatic Adjusting Device for a Clutch Operating Mechanism"; and U.S. Pat. No. 4,285,424 to Sink et al. on Aug. 25, 1981, entitled "Locking Device for a Friction Type Clutch".

Types of manual transmissions in which the present invention may be incorporated may be disclosed by the following United States patents: U.S. Pat. No. 5,036,721 to Gugin on Aug. 6, 1991, entitled "Shift Control Mechanism for a Manual Transmission"; U.S. Pat. No. 4,222,283 to Nagy on Sep. 16, 1980, entitled "Manual Transmission Lubrication System"; U.S. Pat. No. 3,858,460 to Porter et al. on Jan. 7, 1975, entitled "Four Speed Manual Transmission and Control"; and U.S. Pat. No. 5,269,400 to Fogelberg on Dec. 14, 1993, entitled "Transmission Synchronizer".

Types of clutch assemblies in which the present invention may be incorporated may be disclosed by the following U.S. Pat. Nos.: No. 4,635,780 to Wiggen on Jan. 13, 1987, entitled "Clutch Disc for a Motor Vehicle Friction Clutch"; No. 4,684,007 to Maucher on Aug. 4, 1987, entitled "Clutch Plate"; No. 4,433,771 to Caray on Feb. 28, 1984, entitled "Torsion Damping Device for a Clutch Plate"; and No. 4,099,604 to Higgerson on Jul. 11, 1978, entitled "Friction Clutch with Integral Adjuster".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein are hereby incorporated by reference as if set forth in their entirety herein.

The corresponding foreign patent publication applications, namely, Federal Republic of Germany Patent Application No. P 43 14 024, filed on Apr. 29, 1993, having inventor Reinhold Weidinger, and DE-OS P 43 14 024 and P 43 14 024, as well as their published equivalents are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle with automatic compensation for wear, said friction clutch comprising:

a clutch housing;

a clutch disc for being disposed on a transmission input shaft having a longitudinal axis, said clutch disc being axially movable along the transmission input shaft;

a pressure plate for engaging and disengaging said clutch disc with a flywheel of an internal combustion engine, said pressure plate being axially movable with respect to the transmission input shaft;

said clutch disc comprising:

friction lining means disposed between said pressure plate and the flywheel for contacting the flywheel and said pressure plate upon engagement of said clutch disc;

lever means disposed between said clutch housing and said pressure plate for applying pressure to said pressure plate and for biasing said pressure plate towards the flywheel;

ring means disposed on and in contact with said pressure plate substantially concentrically with respect to the longitudinal axis;

said ring means comprising:

two ring portions disposed axially adjacent one another;

said two ring portions together having a first width defined in a direction substantially parallel to the longitudinal axis; and biasing means for biasing said two ring portions to rotate with respect to one another to increase said first width of said two ring portions upon wear of said friction lining means;

one of said two ring portions being disposed to be in substantial contact with said lever means and the other one of said two ring portions being disposed to be in contact with said pressure plate;

a first of said two ring portions comprising a first surface section disposed circumferentially along its corresponding ring portion;

a second of said two ring portions comprising a second surface disposed circumferentially along its corresponding ring portion;

at least a portion of said first surface section being disposed to be in contact with at least a portion of said second surface section;

said first and second surface sections each comprising a first portion and a second portion, said first portion of each of said first and second surface sections having a second width defined in a direction substantially parallel to the axis of rotation, and said second portion of each of said first and second surface sections having a third width defined in a direction substantially parallel to the axis of rotation;

said second width being substantially greater than said third width;

said first portion of one of said two ring portions being disposed to be in in contact with said second portion of the other one of said two ring portions;

said biasing means comprising at least one tension spring;

said at least one tension spring comprising a first end and a second end; and said first end of said at least one tension spring being attached to said first ring portion and said second end of said at least one tension spring being attached to said second ring portion.

2. The friction clutch according to claim 1 wherein said first and second surface sections of each of said first and second ring portions comprise substantially smooth sloped portions extending continuously along and between at least a part of said first portion and at least a part of said second portion.

3. The friction clutch according to claim 2 wherein said friction clutch further comprises:

means for sensing wear of said friction lining means and for permitting said two ring portions to rotate with respect to one another, to increase said first width of said first and second ring portions upon wear of said friction lining means.

4. The friction clutch according to claim 3 wherein each of said first and second ring portions comprise a closed circumference.

5. The friction clutch according to claim 4 wherein:

each of said first and second ring portions comprise sheet metal strips;

said lever means comprises a membrane spring;

said pressure plate is substantially torsionally stationary with respect to said clutch housing;

said pressure plate, said clutch housing and said sensing means each comprise an outer portion;

said friction clutch further comprises bolt means disposed adjacent said outer portions of said pressure plate, said clutch housing and said sensing means;

said friction clutch further comprises:

spring means having a first end and a second end and for restricting the movement of said bolt means;

said first end of said spring means is attached to said pressure plate and said second end of said spring means is attached to said sensing means;

said first end of said at least one tension spring is attached to said first portion of said first ring portion; and said second end of said at least one tension spring is attached to said first portion of said second ring portion.

6. The friction clutch according to claim 5 wherein:

said friction clutch further comprises:

means for releasing said pressure plate and for causing said lever means to pivot and to move in a direction away from said pressure plate, to cause said clutch disc to disengage from said pressure plate and the flywheel;

said bolt means for positioning said pressure plate, said clutch housing, and said sensing means with respect to one another along said outer portions of each of said pressure plate, said clutch housing, and said sensing means, said bolt means being at least partially axially movable with respect to said pressure plate, said clutch housing and said sensing means;

said lever means comprises first opening means and a central portion;

said clutch housing comprises second opening means;

said sensing means extends through said first opening means of said lever means and said second opening means of said clutch housing;

said sensing means comprises a plurality of bent portions;

said spring means comprises a spring disposed adjacent said bolt means; and said lever means is configured for applying pressure to said pressure plate by means of said central portion of said lever means.

7. The friction clutch according to claim 5 wherein:

said friction clutch further comprises:
means for releasing said pressure plate and for causing said lever means to pivot and to move in a direction towards said pressure plate, to cause said clutch disc to disengage from said pressure plate and the flywheel;

said bolt means for positioning said pressure plate and said sensing means with respect to one another along said outer portions of each of said pressure plate and said sensing means, said bolt means being at least partially axially movable with respect to said pressure plate and said clutch housing;

said sensing means comprises a substantially straight portion extending from said bolt means to and along said lever means;

said spring means comprises a compression spring disposed about said bolt means;

said lever means comprises an outer portion; and said lever means is configured for applying pressure to said pressure plate by means of said outer portion of said lever means.

8. The friction clutch according to claim 1 wherein said first and second surface sections of each of said first and second ring portions comprise a plurality of stepped portions extending along and between at least a part of said first portion and at least a part of said second portion.

9. The friction clutch according to claim 8 wherein said first and second ring portions each respectively comprise first and second ring-like portions, said first and second ring-like portions each having a gap extending through each of said first and second ring-like portions.

10. The friction clutch according to claim 9 wherein:

each one of said plurality of stepped portions are disposed in a direction substantially perpendicular to the axis of rotation;

said friction clutch further comprises:
means for sensing wear of said friction lining means and for permitting said two ring portions to rotate with respect to one another to increase said first width of said first and second ring portions upon wear of said friction lining means;

each of said first and second ring portions comprise sheet metal strips;

said lever means comprises a membrane spring;

said pressure plate is substantially torsionally stationary with respect to said clutch housing;

said pressure plate, said clutch housing and said sensing means each comprise an outer portion;

said friction clutch further comprises bolt means disposed adjacent said outer portions of said pressure plate said clutch housing and said sensing means;

said friction clutch further comprises:
spring means having a first end and a second end and for restricting the movement of said bolt means;
said first end of said spring means is attached to said pressure plate and said second end of said spring means is attached to said sensing means;

said first end of said at least one tension spring is attached to said first portion of said first ring portion; and said second end of said at least one tension spring is attached to said first portion of said second ring portions.

11. The friction clutch according to claim 10 wherein:

said friction clutch further comprises:
means for releasing said pressure plate and for causing said lever means to pivot and to move in a direction away from said pressure plate, to cause said clutch disc to disengage from said pressure plate and the flywheel;

said bolt means for positioning said pressure plate, said clutch housing, and said sensing means with respect to one another along said outer portions of each of said pressure plate, said clutch housing, and said sensing means, said bolt means being at least partially axially movable with respect to said pressure plate, said clutch housing and said sensing means;

said lever means comprises first opening means and a central portion;

said clutch housing comprises second opening means;

said sensing means extends through said first opening means of said lever means and said second opening means of said clutch housing;

said sensing means comprises a plurality of bent portions;

said spring means comprises a spring disposed adjacent said bolt means; and said lever means is configured for applying pressure to said pressure plate by means of said central portion.

12. The friction clutch according to claim 10 wherein:

said friction clutch further comprises:
means for releasing said pressure plate and for causing said lever means to pivot and to move in a direction towards said pressure plate, to cause said clutch disc to disengage from said pressure plate and the flywheel;

said bolt means for positioning said pressure plate and said sensing means with respect to one another along said outer portions of each of said pressure plate and said sensing means, said bolt means being at least partially axially movable with respect to said pressure plate and said clutch housing;

said sensing means comprises a substantially straight portion extending from said bolt means to and along said lever means;

said spring means comprises a compression spring disposed about said bolt means;

said lever means comprises an outer portion; and said lever means is configured for applying pressure to said pressure plate by means of said outer portion.

13. A transmission system for a motor vehicle having a friction clutch with automatic compensation for wear, said transmission system comprising:

a flywheel fastened to rotate with the crankshaft of an internal combustion engine;

a clutch housing;

a transmission input shaft having a longitudinal axis;

a clutch disc disposed on said transmission input shaft, said clutch disc being axially movable along said transmission input shaft;

a pressure plate for engaging and disengaging said clutch disc with said flywheel, said pressure plate being axially movable with respect to said transmission input shaft;

said clutch disc comprising:

friction lining means disposed between said pressure plate and said flywheel for contacting said flywheel and said pressure plate upon engagement of said clutch disc;

lever means disposed between said clutch housing and said pressure plate for applying pressure to said pressure plate and for biasing said pressure plate towards said flywheel;

ring means disposed on and in contact with said pressure plate substantially concentrically with respect to the longitudinal axis;

said ring means comprising:

two ring portions disposed axially adjacent one another;

said two ring portions together having a first width defined in a direction substantially parallel to said longitudinal axis;

biasing means for biasing said two ring portions to rotate with respect to one another to increase said first width of said two ring portions upon wear of said friction lining means;

one of said two ring portions being disposed to be in substantial contact with said lever means and the other one of said two ring portions being disposed to be in contact with said pressure plate;

a first of said two ring portions comprising a first surface section disposed circumferentially along its corresponding ring portion;

a second of said two ring portions comprising a second surface disposed circumferentially along its corresponding ring portion;

at least a portion of said first surface section being disposed to be in contact with at least a portion of said second surface section;

said first and second surface sections each comprising a first portion and a second portion, said first portion of each of said first and second surface sections having a second width defined in a direction substantially parallel to said axis of rotation, and said second portion of each of said first and second surface sections having a third width defined in a direction substantially parallel to said axis of rotation;

said second width being substantially greater than said third width;

said first portion of one of said two ring portions being disposed to be in in contact with said second portion of the other one of said two ring portions;

said biasing means comprising at least one tension spring;

said at least one tension spring comprising a first end and a second end; and said first end of said at least one tension spring being attached to said first ring portion and said second end of said at least one tension spring being attached to said second ring portion.

14. The transmission system according to claim 13 wherein said first and second surface sections of each of said first and second ring portions comprise substantially smooth sloped portions extending continuously along and between at least a part of said first portion and at least a part of said second portion.

15. The transmission system according to claim 14 wherein said transmission system further comprises:

means for sensing wear of said friction lining means and for permitting said two ring portions to rotate with respect to one another, to increase said first width of said first and second ring portions upon wear of said friction lining means.

16. The transmission system according to claim 15 wherein each of said first and second ring portions comprise a closed circumference.

17. The transmission system according to claim 16 wherein:

each of said first and second ring portions comprise sheet metal strips;

said lever means comprises a membrane spring;

said pressure plate is substantially torsionally stationary with respect to said clutch housing;

said pressure plate, said clutch housing and said sensing means each comprise an outer portion;

said transmission system further comprises bolt means disposed adjacent said outer portions of said pressure plate, said clutch housing and said sensing means;

said friction clutch further comprises:

spring means having a first end and a second end and for restricting the movement of said bolt means;

said first end of said spring means is attached to said pressure plate and said second end of said spring means is attached to said sensing means;

said first end of said at least one tension spring is attached to said first portion of said first ring portion; and said second end of said at least one tension spring is attached to said first portion of said second ring portions.

18. The transmission system according to claim 17 wherein:

said transmission system further comprises:

means for releasing said pressure plate and for causing said lever means to pivot and to move in a direction away from said pressure plate, to cause said clutch disc to disengage from said pressure plate and the flywheel;

said bolt means for positioning said pressure plate, said clutch housing, and said sensing means with respect to one another along said outer portions of each of said pressure plate, said clutch housing, and said sensing means, said bolt means being at least partially axially movable with respect to said pressure plate, said clutch housing and said sensing means;

said lever means comprises first opening means and a central portion;

said clutch housing comprises second opening means;

said sensing means extends through said first opening means of said lever means and said second opening means of said clutch housing;

said sensing means comprises a plurality of bent portions;

said spring means comprises a spring disposed adjacent said bolt means; and said lever means is configured for applying pressure to said pressure plate by means of said central portion.

19. The transmission system according to claim 17 wherein:

said transmission system further comprises:

means for releasing said pressure plate and for causing said lever means to pivot and to move in a direction towards said pressure plate, to cause said clutch disc to disengage from said pressure plate and the flywheel;

said bolt means for positioning said pressure plate and said sensing means with respect to one another along said outer portions of each of said pressure plate and said sensing means, said bolt means being at least partially axially movable with respect to said pressure plate and said clutch housing;

said sensing means comprises a substantially straight portion extending from said bolt means to and along said lever means;

said spring means comprises a compression spring disposed about said bolt means;

said lever means comprises an outer portion; and said lever means is configured for applying pressure to said pressure plate by means of said outer portion.

20. The transmission system according to claim 13 wherein said first and second surface sections of each of said first and second ring portions comprise a plurality of stepped portions extending along and between at least a part of said first portion and at least a part of said second portion; and said first and second ring portions each respectively comprise first and second ring-like portions, said first and second ring-like portions each having a gap extending through each of said first and second ring-like portions.

* * * * *

UNITED STATES PATENT AND TRADEMARK OFFICE
CERTIFICATE OF CORRECTION

PATENT NO. : 5,540,313
DATED : July 30, 1996
INVENTOR(S) : Reinhold WEIDINGER

It is certified that error appears in the above-indentified patent and that said Letters Patent is hereby corrected as shown below:

In column 10, line 34, after 'following', delete "Uunited" and insert --United--.

Signed and Sealed this

Seventeenth Day of June, 1997

BRUCE LEHMAN

Attest:

Attesting Officer

Commissioner of Patents and Trademarks